July 14, 1959   H. NOYES ET AL   2,895,001
COMBINATION HOSE AND ELECTRICAL CONDUCTORS
Filed July 5, 1955

INVENTOR.
HOWARD NOYES
GEORGE WEST, JR.
BY
ATTORNEY

United States Patent Office 2,895,001
Patented July 14, 1959

2,895,001

COMBINATION HOSE AND ELECTRICAL CONDUCTORS

Howard Noyes, Dayton, Ohio, and George West, Jr., Waynesville, N.C., assignors to The Dayton Rubber Company, a corporation of Ohio Application July 5, 1955, Serial No. 519,954

8 Claims. (Cl. 174—47)

The present invention relates to flexible conduits and the manufacture thereof. More particularly, the present invention relates to conduits for hoses having a fluid-impervious tubular body of elastomeric material with or without fabric reinforcement, said body being externally corrugated and further reinforced by a helical wire embedded therein. Still more specifically, the present invention relates to such a conduit which is capable of accommodating a conductive strand or cable such as might be employed in supplying personal radio or other electrical equipment.

In the past, corrugated, wire-reinforced, flexible conduits of the type considered by the present invention have been employed for use as oxygen hose, "anti-G" tubing and in supplying other personal equipment for pilots, military personnel and the like. With the complication of this type of equipment attending the increased demands upon pilots for example, as a result of flying at increased speeds at higher altitudes for longer periods of time, it has more recently become desirable to combine wherever possible the particular pieces of equipment responsible for the various personal needs. In keeping with this desire for combination and simplification, it has become the usual procedure to combine the pilot's breathing equipment with his radio connections. A result of this has been that the corrugated flexible oxygen tubing usually employed with the personal breathing equipment has also been associated with the electrically conductive wires or cables which supply the transmitter and headphones of the conventional aircraft radio system.

In the past this association between the radio wires and the tubular hose body has been of a permanent nature as has previously been considered absolutely necessary in view of the importance of the continued association between the radio wire and the hose during use. Also, in view of the fact that the individual oxygen hoses are handled considerably as a pilot enters and leaves an aircraft, it has developed that the association between the radio wire and the hose has had to be almost permanently established to prevent the separation or these components during the handling to which they are normally subjected. For example, it is a common practice in view of the particular nature and size of the piece of hose supplying the oxygen mask to carry the hose by the portion of the radio wire which extends therefrom for connection with the radio or other electrical receptacles.

To achieve the necessary permanent association between the radio wire and the tubular hose body, it has been the previous practice actually to embed the wire within the body itself in a manner similar to that in which the reinforcing wire is embedded in the body. While this procedure has represented an improvement, the combined hose and radio wire has still been unsatisfactory in that the carrying of the unit by holding on to a free portion of the wire extending from the hose has resulted in extensive flexing of the wire at the point of its entrance into the tubular body and has further resulted in a premature breaking of the wire at this point. Similarly, whenever it has been desirable to employ a different radio or electrical unit in conjunction with the breathing equipment and oxygen hose, it has been necessary to discard the previously used hose and to obtain one having the newly required type of radio or other conductive wire embedded therein. The particular problem of replacement resulting from this necessity has been considerable in view of the many changes that are constantly taking place in the radio and other electrical equipment with which it is desired to serve the personal needs of aircraft personnel. Similarly, if for any reason it has been desired to change a broken wire, it has been necessary to discard completely the entire hose and wire assembly in view of the fact that obtaining access to the wire would of necessity involve cutting through the tubular hose body thereby destroying its imperviousness beyond repair.

It is accordingly an object of the present invention to provide a composite conduit and conductive wire assembly wherein a satisfactory association between wire and conduit will be maintained.

It is a further object of the present invention to provide such a composite assembly wherein, notwithstanding the firm association between wire and hose body, the wire may be easily replaced without any attendant damage to the hose.

It is still a further object of the present invention to provide a composite hose and conductive wire assembly wherein the wire will be protected against breakage and wear such as has normally been involved in connection with this type of structure.

It is still a further object of the present invention to provide a method for the manufacture of composite hose and radio wire assemblies which will be capable of meeting the objects above stated.

It is yet a further object of the present invention to provide a method for the manufacture of such composite hose and wire assemblies wherein the basic manufacture of the hose body itself will be independent of the form or type of conductive strands subsequently to be employed in connection therewith.

To achieve these and other obvious objects and advantages of the present invention which will be apparent from a reading of the following disclosure, the present invention provides first of all for positioning the radio wire itself about the exterior of the hose body. This exterior location of the conductive strand which has hitherto been considered impossible and unfeasible has now been made both possible and desirable by virtue of applicant's discoveries in connection with the manner in which the same may be positioned about the body in the troughs of the external corrugations thereof and the manner in which the strand may be secured throughout its length to the hose body while at the same time being anchored only at axially spaced points so that it may be easily removed from the hose notwithstanding its uniformly firm engagement therewith. Applicant has further provided an improved structure for receiving the portions of the strand extending from the hose body and associating these free portions with the various electrical connections and receptacles for the electrical equipment in connection with which the hose is to be employed.

Briefly stated, the composite assembly of the present invention involves an externally corrugated flexible tubular body having alternate crests and troughs axially thereof. The radio wire or similar conductive strand is positioned within the troughs about the exterior of the hose body and is anchored to the body at points spaced axially thereof, preferably near each end of the same. The conductive strand once wrapped about the hose body in the troughs of its external corrugations may be anchored near the ends of the hose body simply by looping the strand therearound and tying a knot or by the use of a separate tying cord or string which may either be wrapped circumferentially of the hose body thereby securing a portion of the wire thereto or by tightly drawing a loop of the conductive strand itself about the hose body and then tying a string at the crossing of the loop so formed. It is to be understood that at the time of this tying, the hose body itself has been already completely formed in a manner which will be hereafter more fully described. The free portions of the wire so positioned and anchored on the hose body are led from the points at which they are anchored by tying or otherwise through flexible nipples which may be associated either with the hose body itself or with a closely spaced receptacle or the like to receive the electrical connection.

Since at the time the conductive strand is wound about the exterior of the hose body, the body has already been completely formed and any integration of the strand with the body beyond the purely mechanical means provided by this invention is impossible, a means has been devised for protecting the anchoring means and enhancing the beauty of the finished product by concealing the manner in which the strand is secured to the hose body at the points of its departure therefrom for association with the other electrical connections. To accomplish these last-named purposes, a sleeve corresponding in inside diameter substantially to the outside diameter of the tubular hose body is placed over the hose body at at least that portion thereof wherein the strand is anchored thereto. Since, in order to render the strand readily removable from its association with the hose body the anchoring means must be readily accessible, it follows that the sleeve or cover provided therefor should also be readily removable. According to this invention such purposes are achieved by providing a sleeve of an elastic material having an inside diameter only slightly less than the outside diameter of the hose such that the sleeve will be slightly expanded elastically at the time it is placed upon the hose body and the elastic nature thereof will cause it to firmly grip the hose.

To further assist the cover sleeve and to at the same time provide for an improved fixed relationship between the electrical receptacles and the wire of the hose body, the present invention provides for the positioning of circumferential clamps capable of being fixed in a circumferentially tensed position about the hose body to be positioned about the sleeve thereon, said clamps having fixedly attached thereto suitable receptacles for connection with the wire as it leaves the hose body.

The invention, thus briefly described, may be more clearly understood by reference to the following detailed description of certain preferred embodiments thereof in connection with which reference may be had to the appended drawings.

Figure 1:
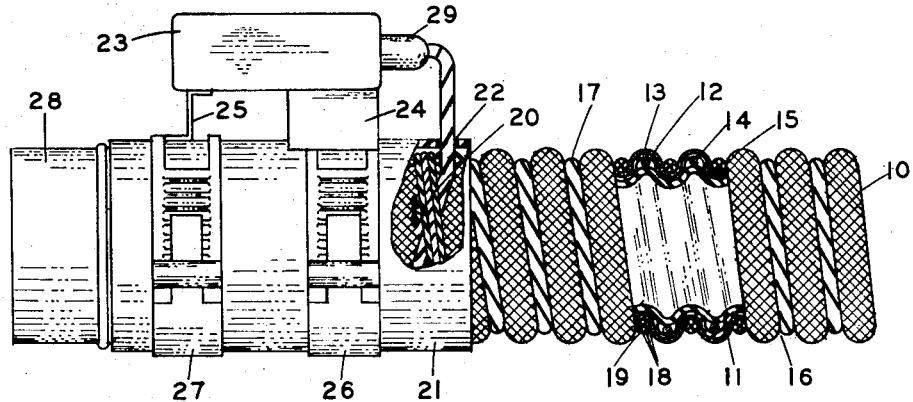
Figure 1 is an elevation partially broken away and in partial cross section showing the composite hose body and conductive wire associated therewith according to the present invention.

Referring now to Figure 1, a preferred hose construction for employment according to the present invention is shown to comprise a tubular body 10 composed of an inner tubular member 11 of rubber or similar elastomeric substance such as the well-known synthetic rubbers including the butadiene-styrene copolymers, butadiene-acrylonitrile copolymers, polysulphide rubbers, polychloroprene and the like. Other elastomers such as elastomeric polyvinyl, polyethylene and the like compositions may be employed. About this inner tubular member 11 is positioned a reinforcing wire preferably in the form of an axially stretched helix 12 which is held against the inner tube by the rubberized tape or fabric 13 positioned thereover and adhered to the inner tube at points between the respective axially spaced turns of the helical reinforcing wire 12. The tape 13 positioned over the reinforcing wire 12 is of a relatively narrow width and follows generally the turns of the reinforcing wire 12 although it may be an axially continuous sheet of fabric wrapped about the inner tube and wire thereupon. Over the assembly thus constructed, a covering layer of fabric such as stockinet 14 may be positioned. This is a tubular loosely woven fabric which has an elastic weave so that it may be stretched over the tube and will contract to engage it firmly. The stockinet may be woven of cotton, rayon, nylon or other textile fibers.

In the manufacture of this type of hose, the inner tube 11 is placed upon a mandrel, the helical reinforcing wire 12 is positioned thereover and axially stretched so as to space the individual helices and to cause the wire to firmly embrace the tubular member 11 whereupon the tape or fabric 13 is wrapped upon the structure while still on the mandrel. At this point the assembly thus far constructed may be subjected to preliminary vulcanization or may be otherwise preset so as to preserve the association of the tape or fabric 13, the reinforcing wire 12 and the inner tube 11 as the same is stripped from the mandrel upon which it has been thus far constructed and positioned upon a second mandrel of a smaller inside diameter than that of the tubular body in its normal position of repose. Upon this second mandrel the hose is subjected to a cording operation wherein an inextensible cord is wound about the hose body under tension between the axially spaced turns of the reinforcing wire so as to push the hose body at points therebetween against the smaller mandrel thereby resulting in a corrugation of the tubular member. While the corrugation of the hose body shown in Figure 1 is present both on the interior and exterior thereof it is to be understood that the present invention is not to be so limited and may be practiced in connection with a hose which has been only exteriorly corrugated.

While the hose constructed as outlined in the preceding paragraph is held in its "corded down" position upon the mandrel, it is subjected to vulcanizing or curing conditions whereupon the elastomeric or rubber-like material of the inner tube and the fabric components employed in the hose construction becomes permanently set. The type of hose just described is similar to that which has been used upon oxygen serving equipment for aircraft for some years and it is in this type of hose body that the conductive wires such as radio wires have in the past been embedded.

The present invention, however, departs from this prior practice in seeing the hose body itself through its final stages of manufacture before it is associated in any way with a conductive strand such as the radio wires. In the corrugation of the tubular body as described above there are of course provided alternately spaced exterior crests 15 and troughs 16. In the preferred and conventional constructions shown, the alternately spaced crests 15 and troughs 16 are actually helical in nature following the helical pattern of the reinforcement 12 within the hose body such that in effect it may be said that a continuous trough 16 extends helically about the entire surface of the hose body being separated by a similar helically extending continuous crest 15. It is conceivable of course that the alternate crests and troughs could extend in a plane exactly perpendicular to the longitudinal axis of the hose body in which case an interconnection of the same by a longitudinally extending groove on the surface could be provided. In any event, within the trough or troughs 16 is positioned the conductive strand such as radio wire 17. As shown in the preferred embodiment illustrated in Figure 1, the conductive strand 17 consists of four separate conductors or wires 18, embedded in a plastic or similar insulating material 19 and in lieu of being so embedded may be simply covered with such a material. In the event the individual conductors such as 18 are merely covered by an insulating coating it of course follows that it may be necessary to further insulate each of the individual connectors in order to preserve the electrical independence of each. The conductors in this case will be, of course, similar to well-known and commonly used electrical conductors in the form of either copper or like metallic wire. A suitable plastic material for integrating these strands to provide the overall cable has been found to be a polyamide resin such as is commercially available under the trade name "nylon." This nylon is particularly satisfactory for use in connection with the present invention in view of the fact that since the strand 17 is about the exterior of the hose it will therefore be subjected to the wearing effects of normal abrasion, weathering and the like, and a durable plastic material is preferably employed.

In keeping with the teachings of the present invention, it is to be understood that there is no necessity for applying a cement or other adhesive between the contacting surfaces of the strand 17 and the tubular hose body 10. In fact, this strand 17 is simply wound firmly in the trough of the hose body once it has been molded and finally constructed and then is anchored to the body at axially spaced points thereon either by means of looping the wire about the body and tying it in a knot or by employing a separate cord or string such as 20 which passes circumferentially of the body in a trough thereof. In the case of a helically extending trough the cord 20 will cross over one crest to occupy a part of two separate troughs and at the same time will pass over the conductive strand 17 as shown in the broken away portion of the sleeve 21. In lieu of this, the cord 20 may simply be wrapped about the strand 17 at the point it is crossed in making the loop so as to preserve the diameter of the loop so formed thereby firmly holding the same against the hose body. In either case, the strand or string 20 is simply tied in a knot or by other means affixed in any well-known manner.

In order to conceal the manner in which the strand 17 is thus affixed to the hose body so as to provide an overall pleasant appearance to the completed hose structure notwithstanding the fact that the tubular body itself had been previously completely formed, the sleeve 21 is provided at least over that portion of the hose body at which the wire or strand 17 is anchored. This sleeve 21 is preferably of an elastic material such that it may be slightly stretched over the hose and will be firmly held thereon by its own elasticity. In order to allow the strand 17 to pass conveniently through the sleeve, an opening such as 22 is preferably provided therein and is so positioned as to allow the passage of the wire therethrough in the direction which it would normally take in passing to an electrical connection or the like.

In order to prevent excessive flexing of the wire at the point at which it leaves the hose body, the receptacle or other electrical connection to which the wire passes is preferably relative rigidly fixed to the hose body itself. In the showing of Figure 1 such a receptacle 23 is permanently associated by means of bracket members 24 and 25 with clamps 26 and 27 which pass circumferentially about the hose body and the sleeve 21 thereon and are such as may be held under circumferential tension about the body. These clamps 26 and 27 not only serve therefore to hold the receptacle 23 in a fixed position to receive the strand 17 but also serves to hold the sleeve 21 against the hose body 10. Where such clamps are employed, it will be understood that it is not absolutely necessary that an elastic sleeve be employed since the clamps themselves will be able to exert a sufficient tension to hold the sleeve upon the hose body. As is the conventional practice in connection with hoses of this type, a fitting 28 is usually inserted in the ends thereof and the fitting is provided with a neck or bushing which will fit inside the end portion of the hose body. It is further the conventional practice in hoses of this type to provide an end portion which is not corrugated so that the clamps 26 and 27 will bear against a smooth cylindrical body which is preferably reinforced by the extension of the end fitting 28.

Notwithstanding the relative fixedness of the relationship between the receptacle 23 and the hose body at that point at which the strand 17 departs therefrom, it has been found to be further desirable to distribute any flexing of the strand which attempts to take place between the hose body and the receptacle by, at some point between these two elements, positioning a flex distributing flexible nipple such as 29 which, in the showing of Figure 1, is shown to be attached to the receptacle 23.

Figure 2:
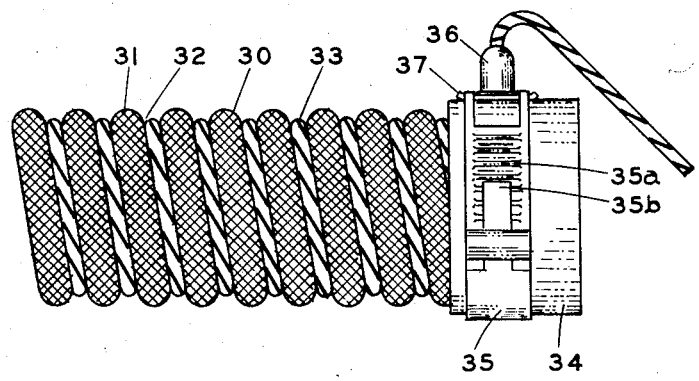
Figure 2 is an elevation of a composite hose and wire assembly of the present invention showing one manner for employing the sleeve, circumferential clamp and flexible nipple thereon.

Referring now to Figure 2, a similar corrugated hose 30 having alternately spaced crests 31 and troughs 32 with a conductive strand 33 positioned in the latter, is shown to comprise a similar end covering sleeve 34 and a circumferential tension clamp 35 positioned therearound. Any of the conventional hose clamps may be utilized for this purpose and that shown at 35 consists of a band on one portion of which are provided raised teeth or slits 35a to be engaged by the pawl 35b on the end of the band to hold the clamp under tension circumferentially of the hose. This particular assembly of clamp, sleeve and nipple is employed where the electrical receptacle to receive the end strands may not be provided in relatively close relationship to the hose in which case the flex-distributing nipple 36 is associated directly with the hose body by being held thereagainst by the clamp 35. Nipple 36 is seen to consist of an integrally formed base 37 and the projecting portion, the base being wider than the remainder of the nipple so that the clamp may pass around the nipple and grip the base thereby holding the same firmly against the hose body.

Figure 3:
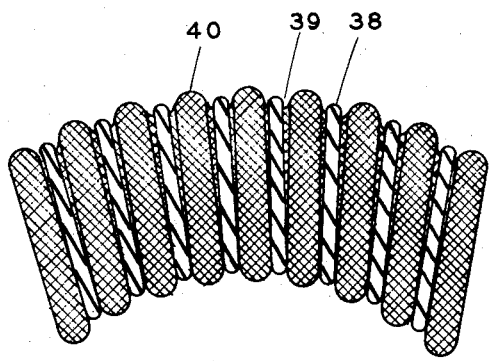
Figure 3 is an elevation of a segment of a hose and wire assembly according to the present invention showing the manner of the association between the two components thereof upon the flexing of the hose body.

As explained above, the conductive strand in this invention being positioned on the exterior of the hose, it is necessary to protect the same against the wearing forces to which it will normally be subjected including normal abrasion. In order to further enhance the protection against abrasive wear, the strand is of such a size with relation to the trough 39 that even when the hose is flexed as shown in Figure 3, the strand 38 will still not project beyond the greatest outside diameter of the hose; i.e., the diameter as determined by the exterior. In other words, a preferred construction according to the present invention incorporates a strand 38 of a diameter which is smaller than the smallest depth of the trough such as 39 when the hose is flexed to the maximum flexure to which it will be subjected in operation. This protection of the strand 38 within the ridges 40 of the corrugated tube along with the protection provided by the plastic material in which the individual wires are embedded adds further to the feasibility of placing the strand about the exterior of the hose.

Although the present invention has been described in connection with certain preferred embodiments thereof, this description is explanatory rather than definitive and does not limit the invention as set forth in the subjoined claims.

We claim:

1. A flexible conduit comprising a helically corrugated tubular body formed with helical crests and troughs around the outer periphery thereof, a helical wire reinforcing member positioned within said tubular body and within the crests thereof, a multiple conductor insulated electrical cable removably embracing the outer surface of said body and positioned within the troughs thereof, the diameter of the cable being smaller than the depths of the troughs, whereby to protect said cable against abrasion while permitting accessibility to said cable for inspection, repair, removal or replacement, and separate means near each end of said tubular body for anchoring said cable thereto at the points where said cable enters and leaves said troughs.

2. A flexible conduit according to claim 1 including a flexible nipple positioned upon and extending from the body of said conduit, said cable extending beyond at least one of the points to which it is anchored and through said nipple.

3. A conduit according to claim 1 including a flexible nipple positioned upon and extending from the body of said conduit, said cable anchored to the body of the conduit by means of a wrapping passing circumferentially around said body, said cable further extending beyond said point of anchoring and passing through said nipple.

4. A conduit according to claim 3 including a clamp extending circumferentially about said body and a receptacle mounted thereupon, said cable passing through said receptacle after passing through said nipple.

5. A conduit according to claim 1 wherein an elastic sleeve surrounds said body at the point where said cable is anchored and wherein said cable passes through an opening in said sleeve.

6. A conduit according to claim 5 wherein a circumferential clamp surrounds said sleeve.

7. A conduit according to claim 6 including a receptacle mounted upon said clamp, wherein the end of said cable is connected to said receptacle.

8. A conduit according to claim 1 including a sleeve surrounding the body at the point where said cable is anchored, said sleeve having an opening therein through which passes a free end portion of said cable, a circumferential clamp surrounding said sleeve, and a flexible nipple having a bore through which passes the free end portion of said cable, said nipple being affixed to said body by said clamp.

References Cited in the file of this patent

UNITED STATES PATENTS

| | | |
|---|---|---|
| 2,060,913 | Weaver | Nov. 17, 1936 |
| 2,513,106 | Prendergast | June 27, 1950 |
| 2,516,864 | Gilmore et al. | Aug. 1, 1950 |
| 2,602,608 | Darling | July 8, 1952 |
| 2,697,452 | Conray | Dec. 21, 1954 |
| 2,739,616 | Duff | Mar. 17, 1956 |

FOREIGN PATENTS

| | | |
|---|---|---|
| 593,068 | Great Britain | Oct. 7, 1947 |